United States Patent
Ellis et al.

(10) Patent No.: US 6,789,007 B2
(45) Date of Patent: Sep. 7, 2004

(54) INTEGRATED ONBOARD MAINTENANCE DOCUMENTATION WITH A CENTRAL MAINTENANCE SYSTEM

(75) Inventors: Gordon F. Ellis, Woodinville, WA (US); Raymond Green, Issaquah, WA (US); Gary S. Jeffrey, Marysville, WA (US); Albert A. Romero, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/888,670

(22) Filed: Jun. 25, 2001

(65) Prior Publication Data

US 2002/0198639 A1 Dec. 26, 2002

(51) Int. Cl.[7] .......................... G01M 17/00; G06F 7/00
(52) U.S. Cl. ............................ 701/33; 701/14; 701/24; 701/36; 701/29; 244/1 R; 340/945; 342/29
(58) Field of Search .............................. 701/33, 14, 24, 701/36, 29; 244/1 R; 340/945; 342/29

(56) References Cited

U.S. PATENT DOCUMENTS

| | | | |
|---|---|---|---|
| 4,788,531 A | * 11/1988 | Corwin et al. ............... 340/945 |
| 4,943,919 A | 7/1990 | Aslin et al. |
| 5,050,081 A | * 9/1991 | Abbott et al. ............... 701/110 |
| 5,161,158 A | * 11/1992 | Chakravarty et al. .......... 714/26 |
| 5,586,065 A | * 12/1996 | Travis ....................... 244/1 N |
| 5,778,381 A | 7/1998 | Sandifer |
| 5,884,202 A | * 3/1999 | Arjomand .................. 340/439 |
| 5,931,877 A | * 8/1999 | Smith et al. .................. 701/29 |
| 5,968,106 A | * 10/1999 | DeVlieg et al. ............. 244/183 |
| 6,003,808 A | 12/1999 | Nguyen et al. |
| 6,112,140 A | * 8/2000 | Hayes et al. .............. 244/75 R |
| 6,115,656 A | 9/2000 | Sudolsky |
| 6,181,992 B1 | * 1/2001 | Gurne et al. .................. 701/29 |
| 6,208,955 B1 | * 3/2001 | Provan et al. ................ 703/20 |

* cited by examiner

Primary Examiner—Thomas G. Black
Assistant Examiner—Olga Hernandez

(57) ABSTRACT

The present invention provides airline mechanics with an electronic maintenance terminal (MT) that displays real time central maintenance computer (CMC) data screens. The invention provides the mechanic with the ability to access fault isolation manual (FIM) troubleshooting procedures via an internal software hot link between the CMC fault code and the FIM procedure. The FIM data is a subset of the electronic portable maintenance aid (PMA) data. In addition to faults the present invention also links flight deck effect (FDE) EICAS messages to FIM troubleshooting procedures.

1 Claim, 6 Drawing Sheets

| CMC EMULATOR | CMC REPORTS | PMA | DATA LOADER | LRU SOFTWARE | AIR DATA AIR/GROUND SIMULATION | PRINT OPTION | AIRLINE SOFTWARE APPLICATION |

```
PRESENT LEG FAULTS SUMMARY REPORT             CMC-L    PAGE 1
VR-HOY    881 RCTP/VHHH  685-2270-010          RR-012   29MAR97 0227

WINDOW HEAT 1R  - STATUS:          30  40  04  00  A

AC BUS 2 NOT POWERED    29MAR97 0203              ATA: 24-11
                             EQUIP:                    POWER ON
                                                       MSG: 24701

WINDOW HEAT 1L  - STATUS:          30  40  03  00  A

AC BUS 4 NOT POWERED    29MAR97 0203              ATA: 24-11
                             EQUIP:                    POWER ON
                                                       MSG: 24703

BLEED HP ENG 1  - STATUS:          36  10  35  00  A

BLEED-1 HIGH PRESSURE   28MAR97 2213              ATA: 36-11
     CONTROLLER/HPSOV        EQUIP:                    CRUISE
     FAIL CLOSED                                       MSG: 36210
```

Fig. 4

INTEGRATED ONBOARD MAINTENANCE DOCUMENTATION WITH A CENTRAL MAINTENANCE SYSTEM

TECHNICAL FIELD

The present invention works in conjunction with a central maintenance computer (CMC) and provides a real time link between an onboard maintenance computer fault indication and an associated troubleshooting procedure from the portable maintenance aid (PMA) data. A quick and efficient way for airline mechanics to access vital fault isolation procedures without the added burden of locating paper copies or carrying fragile mobile computing devices. The selected troubleshooting procedure can be sent to an onboard printer thereby allowing the mechanic to move about the aircraft with the troubleshooting procedure in hand.

BACKGROUND OF THE INVENTION

Problem Solved by the Present Invention

Currently airline mechanics have to board the aircraft and interrogate the CMC to determine a failure affecting the aircraft and then take the fault message/fault number information to the maintenance control center, sometimes miles away to lookup the aircraft maintenance manual fault isolation manual (FIM) for troubleshooting procedure for the fault. With a paper copy of the troubleshooting procedure in hand, the mechanic then returns to the aircraft to begin troubleshooting the fault. Occasionally this process can lead to late departures or cancellations. As a consequence an improved troubleshooting procedure as hereinafter described overcomes unnecessary removal of line replaceable units (LRU's) which would otherwise be recycled back through maintenance shops.

The hereinafter described invention provides the mechanic with quick access to trouble-shooting procedures via an aircraft mounted maintenance terminal (MT). The MT will provide an electronic display of the aircraft maintenance manual troubleshooting procedure for the associated fault onboard the aircraft by clicking a highlighted CMC fault message number on a CMC screen displayed on the MT. This immediate access to the troubleshooting procedure via a real time link will result in increased airline dispatch rates leading to increased customer satisfaction and lower unnecessary LRU removals at cost savings to airlines.

Prior Art

Other approaches currently used:

1. Carrying a mobile computing device to the aircraft with the electronic FIM data stored in the computer and manually entering fault codes via search routines to access the FIM troubleshooting procedure. Disadvantages of this approach include: battery life expectancy of the mobile device; burden of carrying a mobile computing device; fragile nature of mobile devices; possibility of damaging the device due to work environment of mechanics; airline ability to keep sufficient number of mobile devices available for the required work force; an, distance from the aircraft to the maintenance center to obtain a mobile device.

2. Carrying a paper copy of the FIM onboard the aircraft. This is difficult since the manual weighs approximately 40 pounds, takes up considerable space, and must be updated 3 times a year. This approach also requires mechanics to search through reams of paper in order to find the correct troubleshooting procedure, which is both cumbersome and time consuming.

Prior Art References

U.S. Pat. No. 4,943,919 issued Jul. 24, 1990 to Aslin et.al. assigned to The Boeing Company discloses a central maintenance computer system (CMCS). The CMCS encompasses all major avionics, electrical, and mechanical systems installed on the aircraft. The CMCS collects, stores, and displays maintenance information generated by line replaceable units (LRU's). The CMCS also provides a centralized location to initiate system tests. The CMCS has operator interface display and input devices (i.e. multi-purpose control display units (MCDU's) and the interface devices relation to the CMCS are shown in FIGS. 1,3, and 4 of U.S. Pat. No. 4,943,919.

The present invention as hereinafter described is an improvement over U.S. Pat. No. 4,943,919, in that as will be seen in the following description, the present system integrates the CMCS with the maintenance documentation (i.e. electronic portable maintenance aid (PMA) data).

McDonnell Douglas Onboard Maintenance Terminal (OMT) as described in a publication dated 7 Oct. 1996 delivered at the Avionics 96 Conference at Los Angeles, Calif.

McDonnell Douglas MD 11, MD10, and MD 90 model aircraft utilize an onboard maintenance system which consists of a centralized fault display system (CFDS) and an onboard maintenance terminal (OMT) implemented in the 1990's. One of the features of the OMT is to display aircraft faults to applicable maintenance documentation.

In contrast, the present invention differs from the aforementioned McDonnell Douglas OMT in that in addition to faults, the present system also links flight deck effect (FDE) EICAS messages to FIM troubleshooting procedures. The McDonnell Douglas OMT only links faults to FIM troubleshooting procedures.

SUMMARY OF THE INVENTION

The present invention provides airline mechanics with an electronic maintenance terminal (MT) display that displays real time central maintenance computer (CMC) data screens and provides the mechanic with the ability to access the FIM troubleshooting procedure via an internal software hot link between the CMC fault code and the FIM procedure. The mechanic selects via a cursor control device on the MT, a real time highlighted CMC fault or flight deck effect (FDE) being displayed on the maintenance terminal and obtains an immediate display of the aircraft maintenance manual FIM Troubleshooting procedure for the fault/FDE indication. Once the FIM troubleshooting procedure is displayed, the mechanic would then have the choice of working from the display, send the troubleshooting procedure to an onboard printer for a paper copy, or access additional maintenance information and procedures from the PMA data links within the PMA data. At times, a printed copy is useful for work required outside the aircraft such as engine related maintenance.

BRIEF DESCRIPTION OF THE DRAWINGS

FIG. 4 is illustrative of maintenance terminal (MT) display with CMC report;

DETAILED DESCRIPTION OF THE PREFERRED EMBODIMENT

Figure 1:
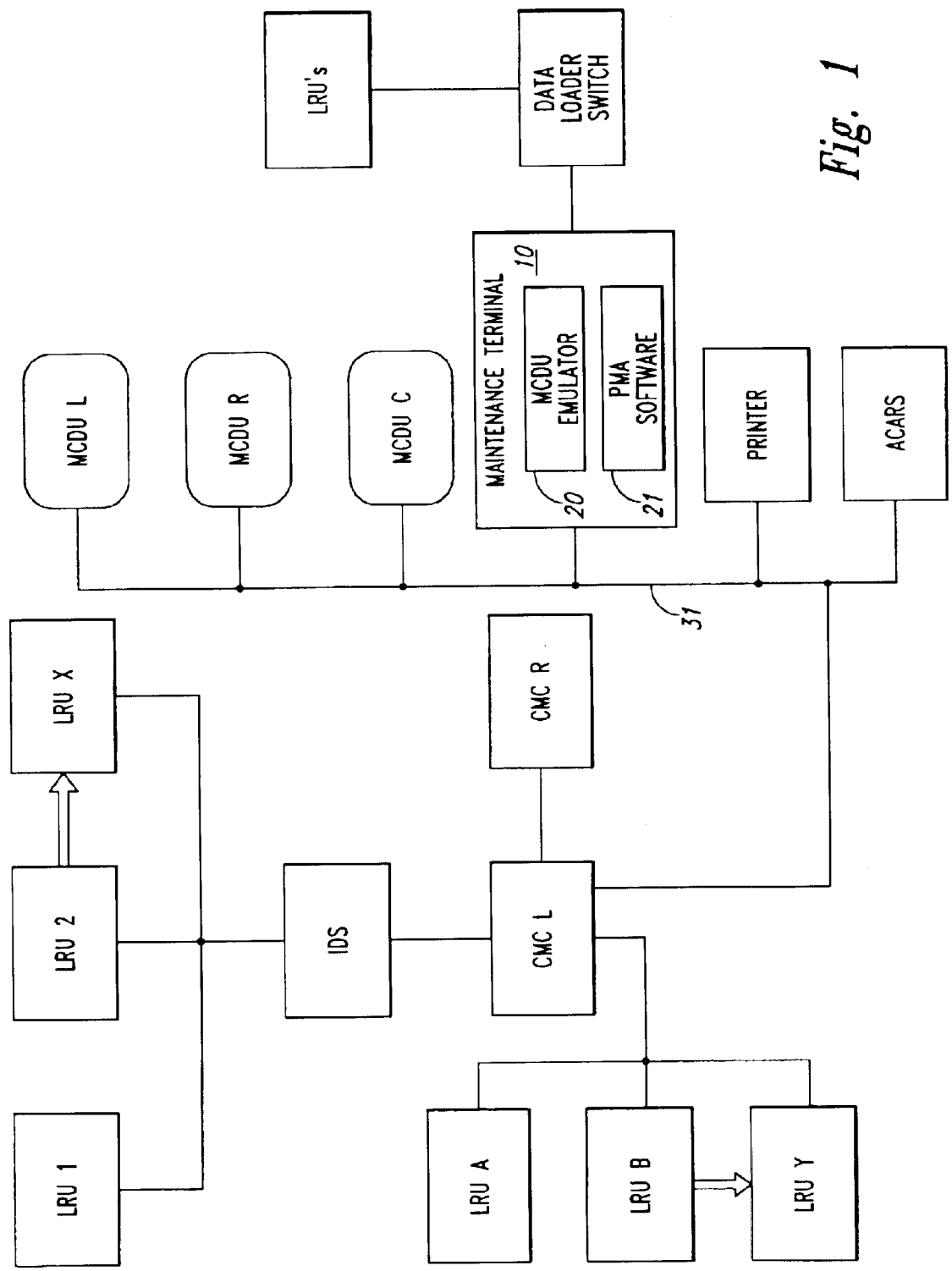
FIG. 1 is a block diagram of the present central maintenance computer system with onboard maintenance terminal.

The present system is an improvement over the system shown in U.S. Pat. No. 4,943,919 incorporated herein by reference. The present system integrates the CMCS with the maintenance documentation. The present system as shown in FIG. 1 when installed aboard an aircraft provides airline mechanics with an electronic maintenance terminal (MT) 10 that displays real time central maintenance computer (CMC) menu screens via MCDU emulation. The present system provides the mechanic with the ability to access the fault isolation manual (FIM) troubleshooting procedures via an internal hot link between the CMC fault code displayed in CMC MCDU menus and the FIM procedure. The FIM data is a subset of the PMA data. Since MT 10 will emulate a MCDU, it can be considered a CMCS operator interface display and input device. The CMC fault codes are displayed in CMC Present Leg Message, Existing Fault Message, Fault History Message, Ground Test Message, and Confidence Message Menu. The CMC Menu structure is shown in FIG. 10 of U.S. Pat. No. 4,943,919.

Figure 2:
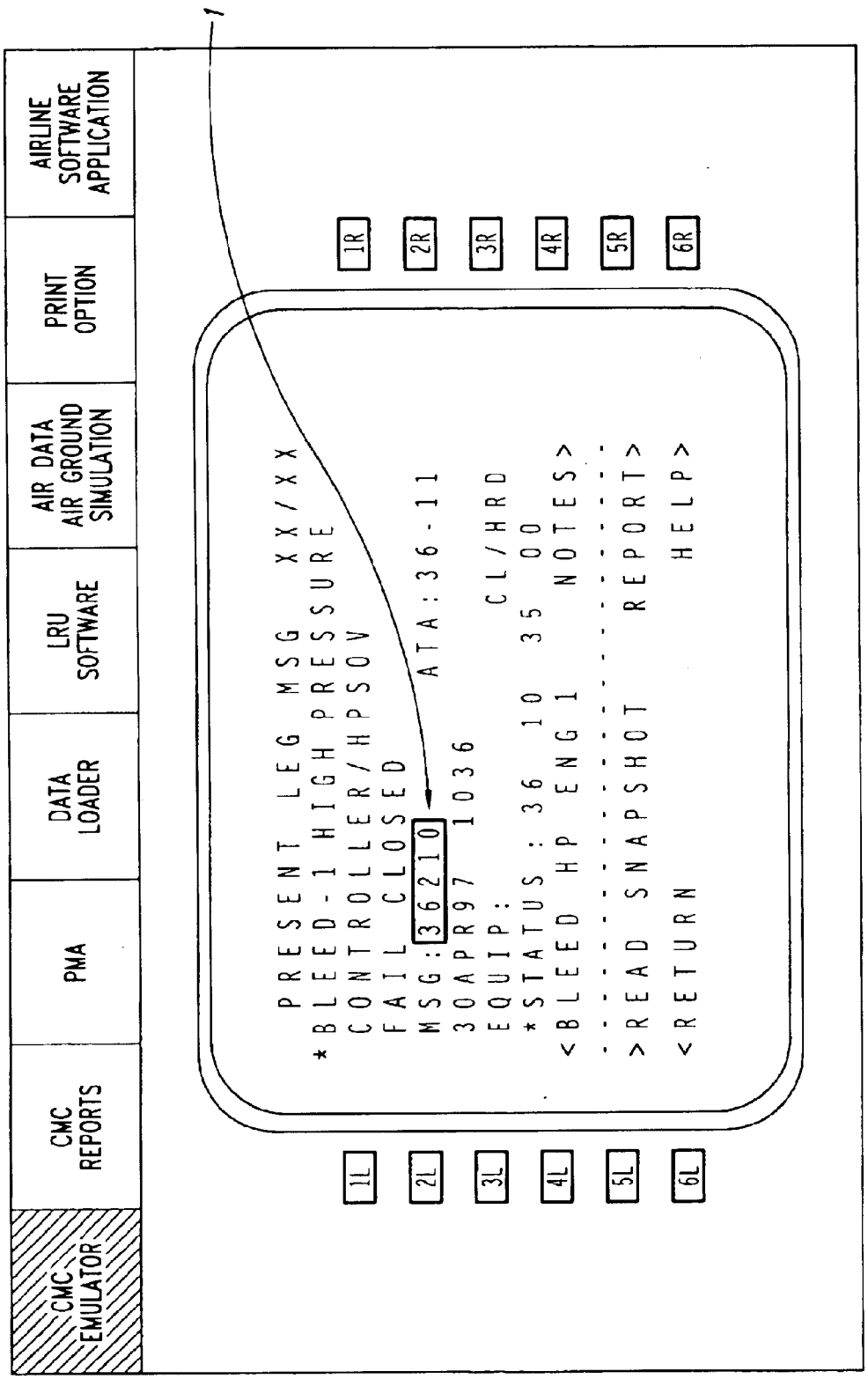
FIG. 2 is illustrative of maintenance terminal (MT) display showing CMC menu via MCDU emulation.
Figure 3:
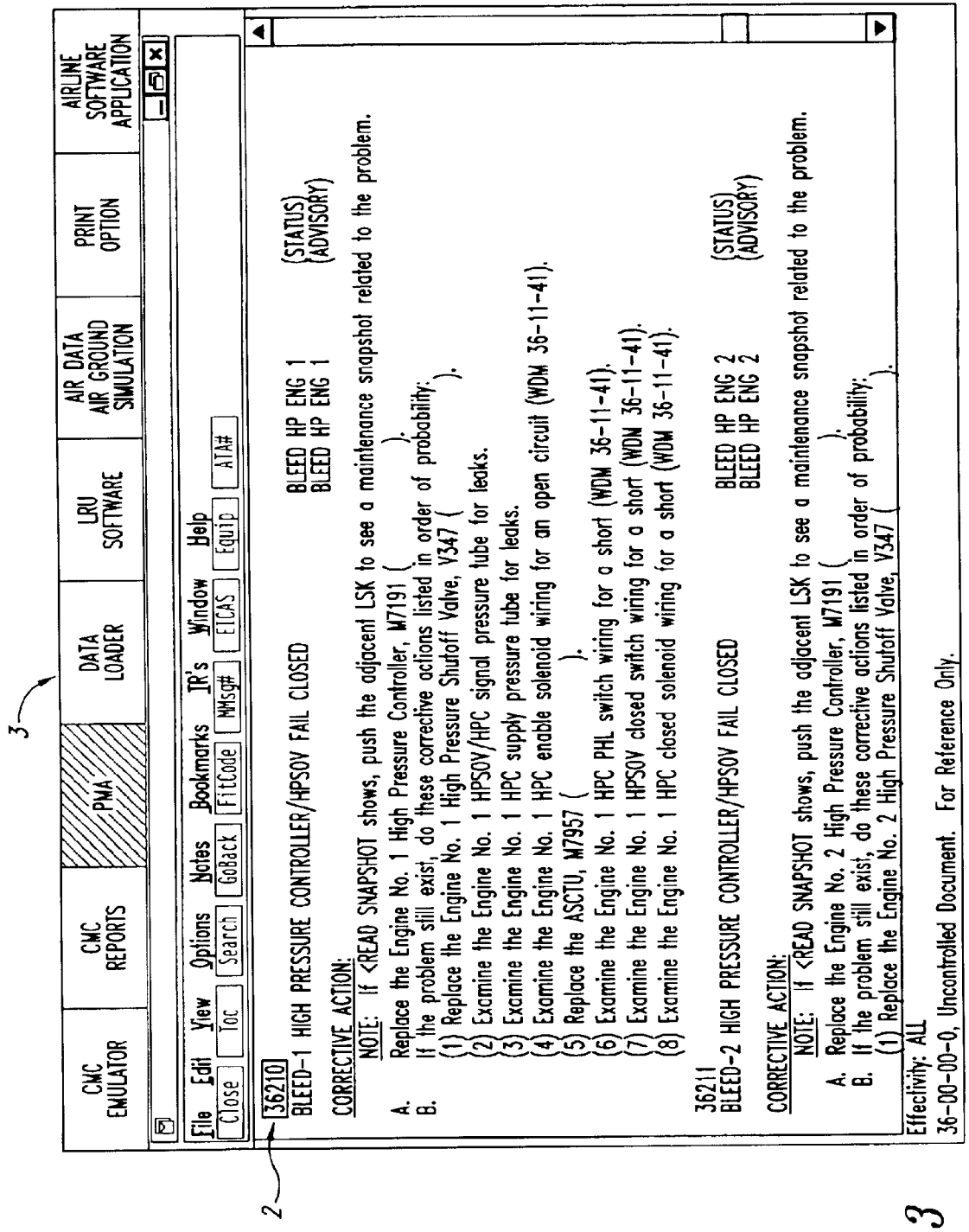
FIG. 3 is illustrative of maintenance terminal (MT) display with FIM data (selected from FIG. 2)

The mechanic selects a cursor device on MT 10, a real time highlighted CMC fault or flight deck effect (FDE) being displayed on CMC MT 10 menus shown as item 1 in the display of FIG. 2 and get immediate display of the aircraft maintenance manual FIM troubleshooting procedure for the fault/flight deck effect (FDE) indication shown as item 2 in the display of FIG. 3.

Figure 5:
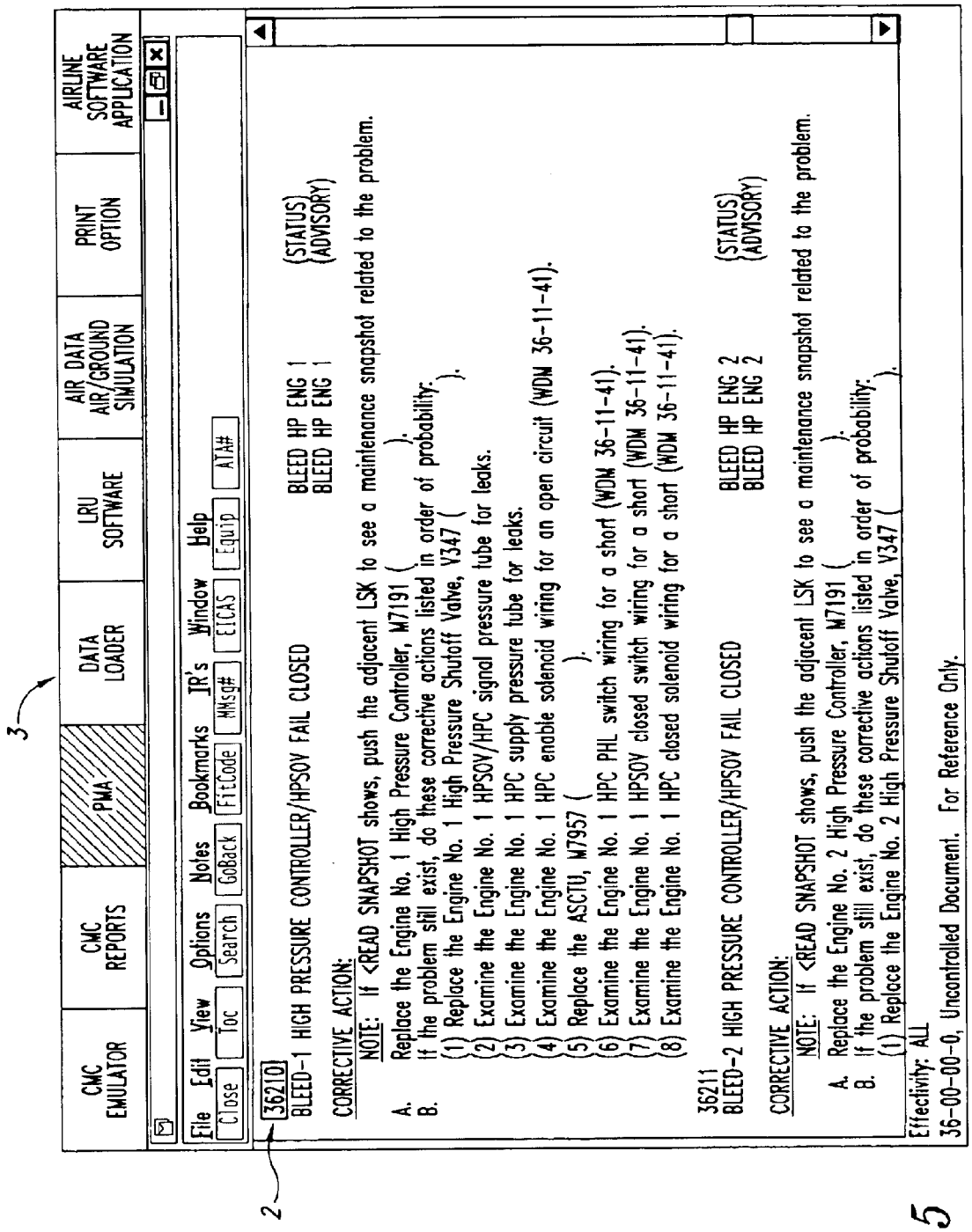
FIG. 5 is illustrative of maintenance terminal (MT) display with FIM data (selected from FIG. 4)

In addition, the mechanic would also be able to select a CMC report, download it to MT 10, display the report on MT 10, and select via the cursor control device, the highlighted CMC fault or flight deck effect (FDE) being displayed on MT 10 as shown in item 1 of FIG. 4, and get immediate display of the aircraft maintenance manual FIM troubleshooting procedure for the fault/FDE indication shown as item 2 of FIG. 5.

Figure 6:
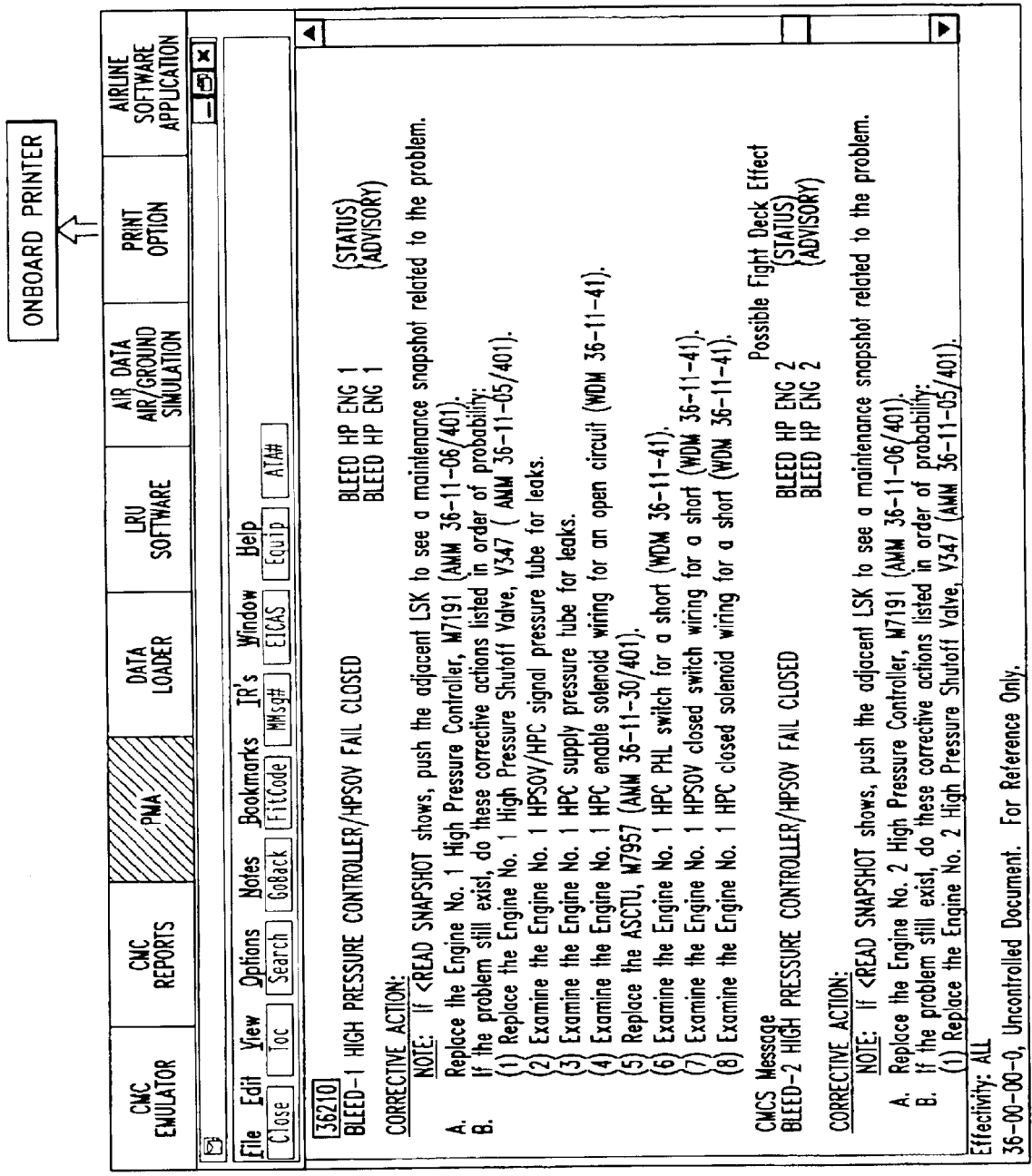
FIG. 6 is illustrative of maintenance terminal (MT) display with FIM data including selection for printed hardcopy.

Once the FIM troubleshooting procedure is displayed as shown in FIGS. 3 and 5 on the MT screen item 3, the mechanic would then have the choice of working from the display, send the troubleshooting procedure to onboard printer 10 as shown in FIG. 6 for a paper copy, or access additional maintenance information and procedures from the PMA data via links within the PMA data.

FIG. 1 is a block diagram of the present system which includes MT 10 as described above. FIGS. 1,2,3,4,7, and 8 of U.S. Pat. No. 4,943,919 incorporated herein by reference show the system of FIG. 1 of the present invention with the exception of MT 10. Since functionality of MT 10 as hereinabove described includes MCDU emulation 20, MT 10 can be considered a CMCS display and input device. FIGS. 2,3,4, and 5 of the present system show examples of the interface links between the CMC MT menus and the troubleshooting procedures from PMA data.

MT 10 functions include access to CMC functions via ARINC 429 busses 31; air/ground simulation capabilities; air data computer (ADC) simulation capabilities; digital maintenance manual (PMA) data storage and retrieval capabilities 21; and linkage of CMC faults and FDE's (EICAS message FRM codes) to PMA data.

MT 10 is installed in the flight compartment of the aircraft. CMC menus can currently be displayed on MDCU. MT 10 provides maintenance personnel access to central maintenance computer system (CMCS) functions by emulating the display functions of a MDCU and/or by retrieving CMC reports. MT 10 also provides a direct link from the fault messages displayed via the CMC menus or listed in CMC reports to the digital maintenance manual (PMA) data.

MT 10 comprises a display, a cursor control device, a keyboard, an internal hard drive, a floppy diskette drive, a CD-ROM drive, interfaces with ARINC 429 busses, interfaces for brightness and contrast control, and a graphical output printer bus. MT 10 utilizes the Microsoft Windows operating system, hence all MT 10 application software (i.e. MCDU emulation software, PMA, etc.) would function with this Microsoft (MS) operating system, including software links between the MCDU emulation software and PMA.

What is claimed is:

1. In combination:

a central maintenance computer system; and, an onboard maintenance terminal;

said onboard maintenance terminal linking faults to maintenance documentation;

said onboard maintenance terminal further linking flight deck effect (FDE) engine indication crew alerting system, (EICAS) messages to the aircraft fault isolation manual, (FIM) troubleshooting procedures; and, said onboard maintenance terminal further functioning to provide air/ground simulation capabilities; and air data computer (ADC) simulation capabilities.

* * * * *